United States Patent [19]

Shelley

[11] Patent Number: 4,702,226
[45] Date of Patent: Oct. 27, 1987

[54] HOT WATER TANK WATER PREHEATER

[76] Inventor: Delwyn J. Shelley, 23 Walker La., Stockton, Calif. 95205

[21] Appl. No.: 894,555

[22] Filed: Aug. 8, 1986

[51] Int. Cl.$^4$ .......................... F24H 1/00; F22B 33/00
[52] U.S. Cl. ...................................... 126/362; 126/31; 122/20 B; 122/421; 122/DIG. 3; 122/155 A
[58] Field of Search ............... 126/362, 361, 365, 364, 126/31, 34; 122/17, 14, 20 B, 44 A, 82, 109, 155 A, 137, 421, 412, DIG. 3, DIG. 10

[56] References Cited

U.S. PATENT DOCUMENTS

| 106,688 | 8/1870 | Goodfellow | 126/31 |
|---|---|---|---|
| 273,169 | 7/1883 | Segal | |
| 331,797 | 12/1885 | Lahr | 126/31 X |
| 1,038,113 | 9/1912 | Garrard | 122/20 B |
| 1,065,837 | 6/1913 | Reichhard | 122/421 |
| 1,226,516 | 6/1917 | Hill | |
| 1,988,238 | 1/1935 | Coplen | 126/31 |
| 2,276,381 | 3/1942 | Faeber | 122/412 X |
| 2,276,780 | 3/1942 | Johansson | 122/412 X |
| 2,521,462 | 4/1950 | Kinzelmann | |
| 2,653,583 | 9/1953 | Granger | 122/412 X |
| 4,163,430 | 1/1979 | Neumann | |
| 4,175,518 | 11/1979 | Reames, Jr. | 122/421 X |
| 4,206,875 | 6/1980 | Grasso | 122/20 B X |
| 4,484,564 | 11/1984 | Erickson | |

Primary Examiner—Randall L. Green
Attorney, Agent, or Firm—Lothrop & West

[57] ABSTRACT

A preheater for a conventional gas-fired water heater having an outer container, an inner reservoir, water conduits in fluid communication with the reservoir and openings in the outer container allowing the through passage of hot exhaust flue gas from a conventional hot water tank to have an increased residence time with respect to the reservoir for efficient heat transfer of the hot flue gases. The heated water is fed from the preheater to the hot water tank on demand. The preheater is placed atop the hot water tank to receive the hot flue gases therefrom.

4 Claims, 14 Drawing Figures

HOT WATER TANK WATER PREHEATER

FIELD OF THE INVENTION

The following invention relates generally to an instrumentality for preheating water that is ultimately to be heated in a hot water tank.

BACKGROUND OF THE INVENTION

A gas fired water heater typically includes a burner element placed strategically adjacent a surface of the hot water reservoir for imparting heat to the water within the reservoir. Normally after this heat exchange, hot exhaust flue gases from the gas fired hot water heater are vented to the atmosphere through a flue pipe. These flue gases are at elevated temperatures and thus, it is clear that all of the available caloric energy has not been extracted by the water reservoir prior to venting. This inefficiency, of course, results in needlessly higher energy bills for hot water use than would be experienced had there been a more efficient heat extraction initially.

Since most of these hot water tanks were designed and continue to reflect technology at a time when energy was relatively cheap and social consciousness about waste of natural resources was not especially high, a long felt yet heretofore unfulfilled need has existed for a more efficient energy extraction to impart heat to the water in the tank.

The following patents reflect the state of the art of which Applicant is aware insofar as these patents appear germane to the patent process:

| 273,169   | Segal      | 1883 |
| 1,226,516 | Hill       | 1917 |
| 2,521,462 | Kinzelmann | 1950 |
| 4,163,430 | Neumann    | 1979 |
| 4,484,564 | Erickson   | 1984 |

While all of these known prior art structures recognize the need and desireability for preheating water for the associated energy savings, the instant invention is distinguished over the known prior art not only structurally, lending it to facile retrofitting on existing systems, but also in the magnitude of the efficiency obtained thereby. The structural distinctions provide benefits unattainable by the prior art and are not rendered obvious wen considering any of the known prior art either singularly or in any conceivable combination. For example, while Hill has a reservoir in the path of exhaust flue gases, there is nothing disclosed which increases residence time of the gas.

SUMMARY OF THE INVENTION

An instrumentality is provided which lends itself to deployment on a top surface of a conventional water heater, which is the site of flue gas egress on a conventional gas fired hot water heater. A plurality of downwardly extending legs allow the preheater to nest on top of the hot water heater without the need for any modification. A central-most area of the preheater includes a bottom surface having a central opening to allow the flue duct from the conventional gas water heater to be placed therein. The relationship between the opening and the flue gas exhaust duct is such that a natural and tight seal is afforded to preclude the possibility of flue gases escaping from the area of interconnection between the preheater and the heater. The hot exhaust gases are placed in heat exchange relationship with water that passes through a preheating water tank on route to the conventional water heater. Water is replenished on demand as dictated by the conventional hot water tank based on the potential energy inherent in having the preheater's tank at a higher elevation than the conventional hot water tank. There are no moving parts. Heat from the exhaust flue gases will preheat the water in the preheater thereby extracting energy which otherwise would have been wasted allowing the primary heater of the hot water heater to work more efficiently since the water coming into the conventional heater is at a higher temperature.

Since most gas heaters include a pilot light, the energy extracted from all phases of the operation of a conventional gas heater will not be wasted.

OBJECTS OF THE INVENTION

Accordingly, this invention has as a primary objective the provision of a new and novel water preheater for a conventional gas fired hot water heater.

It is a further object of this invention to provide a device as characterized above which readily lends itself to retrofitting on existing gas fired hot water heaters.

It is a further object of this invention to provide a device as characterized above which is extremely simple in design having no moving parts, durable in construction for long life, and highly efficient in use.

It is a further object of this invention to provide a device as characterized above which lends itself to mass production techniques.

It is yet a further object of this invention to provide a device as characterized above which will provide substantial energy savings. Thus, the pay back time for the cost of the appartatus is relatively short.

It is yet a further object of this invention to provide a device as characterized above which will lend itself to facile installation atop a hot water tank so that a person of ordinary skill can retrofit the device without the use of specialized tools and associated expenses requiring a skilled artisan.

These and other objects will be made manifest when considering the following detailed specification when taken in conjunction with the appended drawing figures wherein there has been provided an improved preheater for a hot water tank.

BRIEF DESCRIPTION OF THE DRAWING FIGURES

DESCRIPTION OF THE PREFERRED EMBODIMENT

Figure 1:
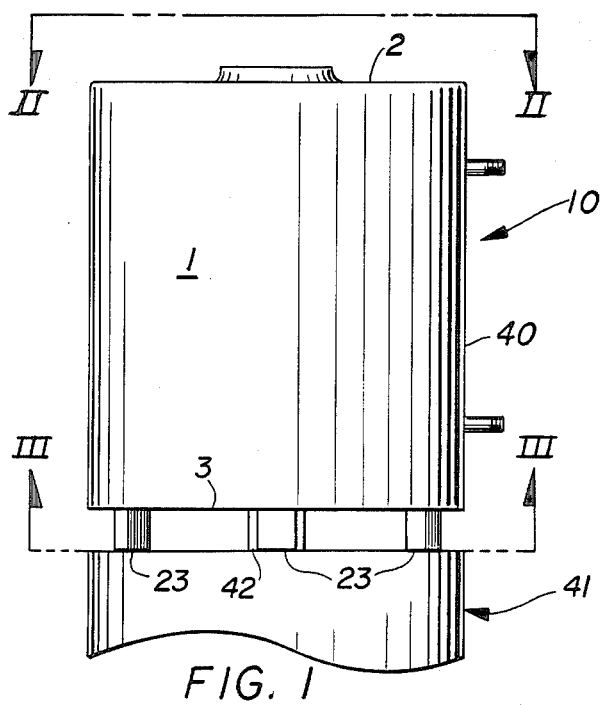
FIG. 1 is a side view of the apparatus according to the present invention resting atop a gas water heater.

Referring to the drawings now wherein like reference numerals refer to like parts throughout the various drawing figures, reference numeral 10 is directed to the preheater according to one form of the present invention.

More particularly and with specific reference to FIGS. 1,2,3,6 and 8 the preheater 10 includes a container 40 having an annular outer wall 1, a top wall 2 and a bottom wall 3. The bottom wall 3 has an opening 4 for the slideable insertion therein of an exhaust flue 42 which extends from a top wall of a gas water heater 41. The top wall 2 has an outlet 5, which will allow exhaust gases to pass there beyond. Thus, the preheater 10 can be effectively and expeditiously interposed along a section of exhaust flue conduit with a minimal amount of effort. The openings 4 and 5 are dimensioned such that they each will slideably receive a standard exhaust flue conduit with a minimum amount of effort.

Directly above the bottom wall 3 and disposed within the interior of the container defined by the annular side wall 1 and top and bottom walls 2 and 3, a baffle plate 6 is provided having a plurality of holes 7 circumscribing an outer periphery of baffle plate 6 causing the flue gases to migrate therethrough. This will increase the residence time of the flue gases in the preheater.

The container 40 serves as an exterior jacket which surounds a water reservoir 9 having an annular side wall 13 spaced in from and concentric with the outer wall 1 and an arcuate top wall 11 and a bottom wall 12 having a slightly inwardly concave contour for additional surface area to facilitate heat exchange. It is important to note that the annular side wall 13 of the water reservoir 9 has a skirt portion 13a which extends down below the bottom wall 12 and supports the baffle plate 6. Its significance will be explained hereinafter. An inlet conduit 15 allows communication of water into the water reservoir 9 of the preheater 10 and an outlet conduit 16 delivers water to the gas water heater's cold inlet line on demand, that is when the hot water tank needs replenishment.

Since the walls of reservoir 9 are spaced apart from the walls of container 40, the presence of surrounding insulation 14 (shown only partially) will prevent heat loss therebeyond. Additionally, the insulation serves as a seal so that hot exhaust gases coming up through the inlet 4 will not migrate beyond the container 40. Hot exhaust gas from the gas water heater passes through the preheater 10 by means of at least one and preferably a plurality of upwardly extending, flue pipes 17 each having an opening on the bottom wall 12 of the reservoir 9 allowing the flue gases to pass within the interior of the pipes 17. To further increase the residence time of the flue gases within the reservoir 9, an auger-type heat transfering fin 18 is disposed in each of the pipes 17 serving as a baffle. The auger 18 is supported within each pipe 17 by means of a centrally disposed stem 19 coincident with the longitudinal axis of the pipe 17 and carrying the auger 18. Distal stem extremities are supported in the pipe 17 by means of an auger spider 20. See FIG. 7. The spider has a central hub and two radially extending arms to the inner wall of pipe 17.

Figure 2:
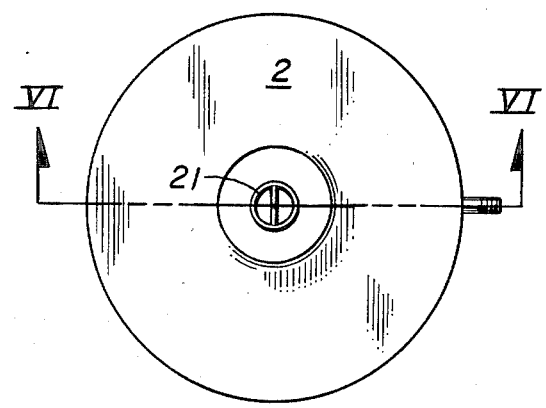
FIG. 2 is a top plan view thereof.
Figure 3:
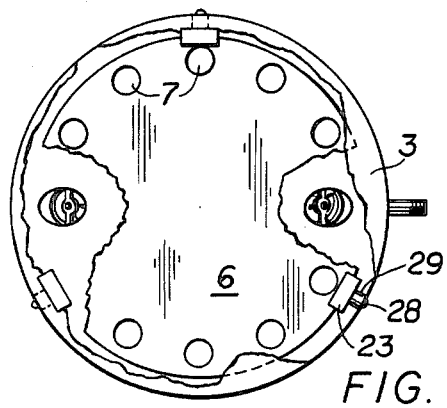
FIG. 3 is a bottom plan view thereof with portions fragmented out for purposes of clarity.
Figure 6:
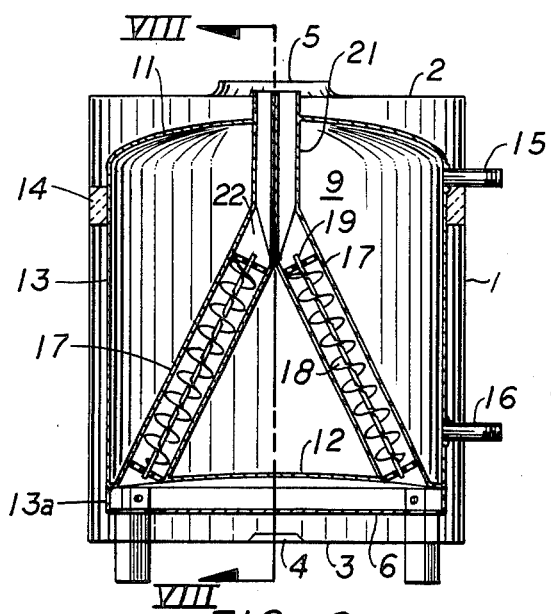
FIG. 6 is a sectional view taken along lines 6—6 of FIG. 2.
Figure 13:
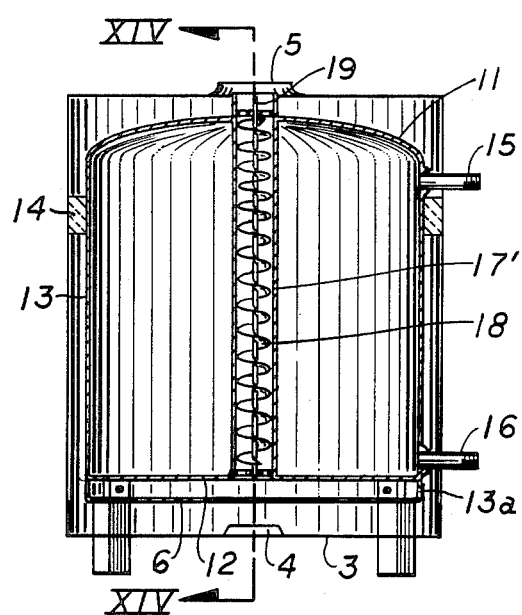
FIG. 13 is a sectional view of FIG. 9 taken along the plane indicated by the line 13—13 in FIG. 10.
Figure 14:
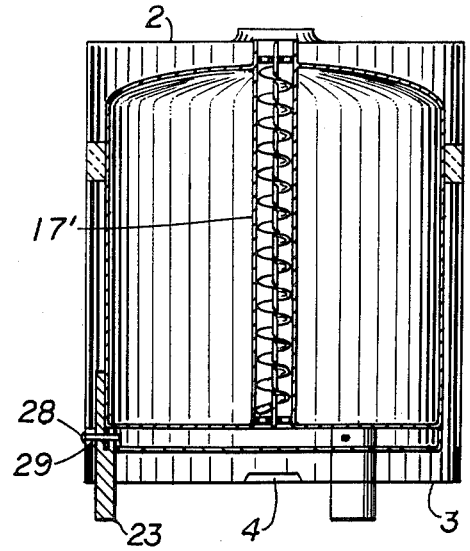
FIG. 14 is a sectional view taken along lines 14—14 of FIG. 13.

As shown in FIGS. 2 and 6, gases passing beyond the pipe 17 communicate with an outlet flue 21 through a collection manifold 22 for the plurality of pipes 17 contained within the reservoir 9. By way of illustration, FIG. 6 shows two such pipes 17 whereas FIGS. 13 and 14 show a single pipe 17. In the case of FIG. 6 therefor, since the exhaust outlet flue has to have an exterior contour which is substantially circular, the bifurcated manifold 22 is provided between the pipes 17 and the flue duct 21 to pass all of the flue gases into the outlet 21. See the manifold 22 in FIG. 6.

Figure 4:
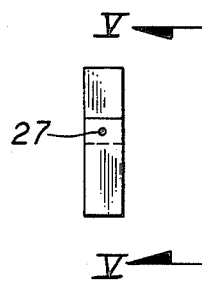
FIG. 4 is a side view of one of the legs associated with the apparatus according to the present invention.
Figure 5:
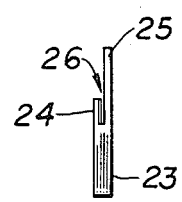
FIG. 5 is a detail of the leg shown in FIG. 4.
Figures 7, 8:
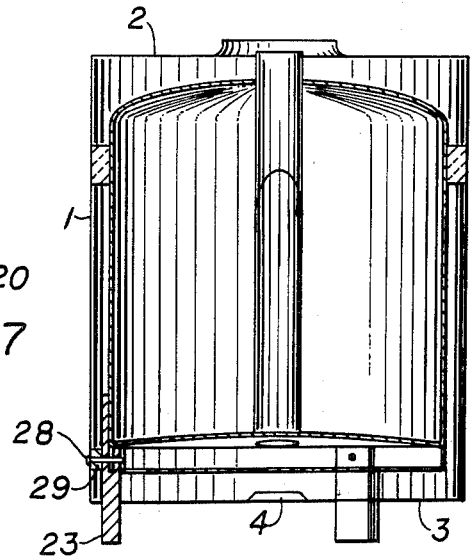
FIG. 7 is a detail of a spider used in mounting a heat exchange auger shown in FIG. 6.
FIG. 8 is a sectional view taken along lines 8—8 of FIG. 6.
Figure 9:
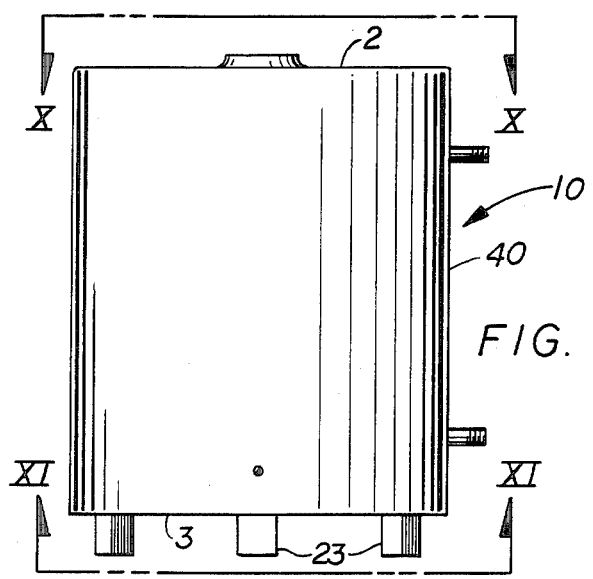
FIG. 9 is a side view similar to FIG. 1 showing a second embodiment, the gas water heater being omitted to reduce the extent of the figure.
Figure 10:
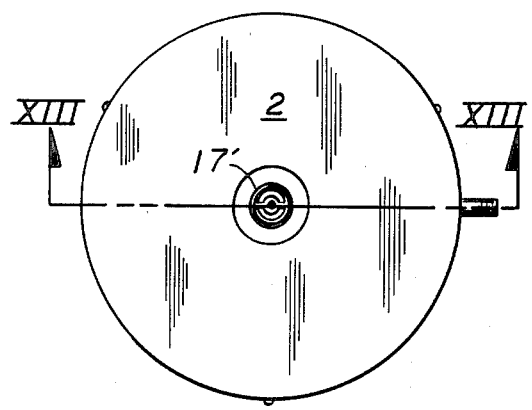
FIG. 10 is a top plan view of FIG. 9.
Figure 11:
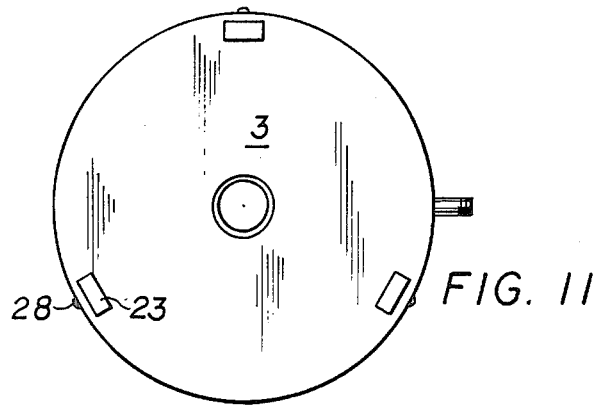
FIG. 11 is a bottom plan view of FIG. 9.
Figure 12:
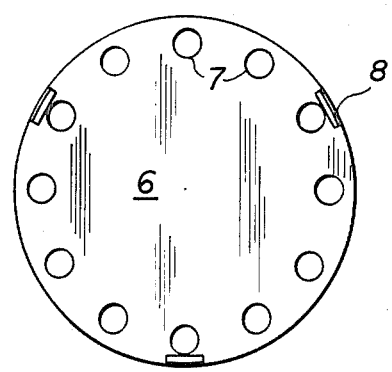
FIG. 12 is a detail of a baffle plate contained within the preheater of FIG. 9 at a lower portion thereof.

Attention is directed to FIGS. 4, 5 and 8 which show a gas means for supporting the preheater 10 on the conventional hot water heater 41. In a preferred embodiment, three legs 23 depend from the skirt 13a of the reservoir 9 through the bottom wall 3 of container 40. Each leg has a bifurcated upper terminus including a short leg 24 and a long leg 25 with a bight portion 26 there between. The purpose of the bight portion is to straddle a free edge of the downwardly extending skirt 13a formed from the wall 13. These legs 23 can be fixed to the skirt portion by means of a screw 28 through a screw hole 27. A spacer 29 helps to locate the leg between the container 40 and reservoir 9. Note that holes 8 are provided in the baffle plate 6 to accommodate the legs 23.

FIGS. 9 through 14 show a second embodiment illustrative of another form of the invention wherein a single pipe extends through the center of the water jacket, the single pipe 17' is configured to directly receive the exhaust gases. Note that the baffle plate 6 has no central opening.

Note that the area above the inlet 4 in all embodiments has a greater cross sectional area than the inlet 4 to reduce gas velocity, increasing residence time. Further the pipes 17 (and 17') have substantially the same cross-sectional area as the inlet opening 4.

Having thus described the invention it should be apparent that numerous structural modifications are contemplated as being a part of this invention as described hereinabove and claimed hereinbelow.

I claim:

1. A preheater for a conventional gas hot water heater comprising in combination:
   a. a water reservoir placed above a top surface of the conventional gas hot water heater and exposed to flue gases from an exhaust duct of the gas hot water heater, said water reservoir including a skirt depending from the lower peripheral portion thereof;
   b. a pair of conduits in fluid communication with said reservoir allowing the through passage of water so that the water can be first preheated and then admitted to the conventional gas hot water heater;
   c. a container circumscribing said reservoir for capturing flue gases from the exhaust duct of the conventional gas hot water heater,
      1. said container including an annular side wall, a top wall and a bottom wall, said bottom wall having an opening to snugly accommodate said exhaust gas flue duct of said conventional gas hot water heater, said container further including an outlet in said top wall to allow the passage of exhaust gases therebeyond;
   d. a plurality of legs extending from said skirt on said lower portion of said reservoir and passing through leg holes in said bottom wall of said container to rest upon the top surface of the conventional gas hot water heater;

e. and means for increasing the residence time of the flue gases with respect to said reservoir for enhancing the efficiency in extracting heat from the hot exhaust flue gases from the conventional gas hot water heater, said means including:
1. a plurality of pipes adapted to pass hot flue gases through said reservoir and having an auger-type baffle contained therein to increase the residence time of the gas therein, each of said augers being supported on a stem having upper and lower extremities mounted on spiders engaging the interior wall of the respective one of said pipes, said pipes joining to form a manifold having substantially the same cross sectional dimension as the exhaust gas flue duct opening of the conventional gas hot water heater, and
2. a baffle plate interposed between said reservoir and said bottom wall of said container to provide an area having a larger cross section than the opening snugly accommodating the exhaust gas flue duct of the conventional gas hot water heater, thereby diffusing the exhaust gas entering the area and further increasing the residence time about said reservoir, said baffle plate including a plurality of holes circumscribing said plate for the passage of flue gas therebeyond; and, f. insulation interposed between the upper portions of said reservoir and said container.

2. A preheater for a conventional gas hot water heater comprising in combination:
a. a water reservoir located above a top surface of the hot water heater and placed in fluid communication with an exhaust duct of the hot water heater, said reservoir having a depending skirt;
b. a pair of conduits in fluid communication with said reservoir allowing the through passage of water so that water can be preheated and then admitted to the hot water heater;
c. a container circumscribing said reservoir, said container including an annular side wall, a top wall and a bottom wall, said bottom wall having an opening to accommodate an exhaust gas flue duct from the hot water heater, and said top wall having an outlet to accommodate a flue duct allowing the passage of exhaust gas therebeyond;
d. a plurality of legs mounted on said skirt and passing through by holes in said container to rest upon the top surface of the hot water heater;
e. insulation interposed between said reservoir and said container; and,
f. means for increasing the residence time of the flue gases with respect to said reservoir whereby efficiency in extracting heat from the hot exhaust flue gases from the hot water heater is enhanced, said means including:
1. a plurality of pipes disposed in said reservoir for passing hot flue gases therethrough and having contained therein auger-type baffles mounted on stems supported at opposite extremities by spiders engaging the interior walls of said pipes, said pipes merging into a manifold having an outlet with a cross sectional area substantially the same as the opening for the exhaust gas flue duct from the hot water heater, and
2. a baffle plate interposed between said reservoir and said bottom wall of said container, said baffle plate including a plurality of holes circumscribing said plate for the passage of flue gas therethrough, the cross sectional area of the baffle plate being larger than the cross sectional area of the opening for the exhaust gas flue duct from the hot water heater for diffusing the gases emerging from said flue duct.

3. A preheater kit for enhancing the thermal efficiency of a gas-fired hot water heater comprising, in combination:
a. a water reservoir located above the gas heater and exposed to the hot flue gases from the gas heater, said reservoir having a depending skirt;
b. a plurality of legs mounted on and depending from said skirt to rest upon the top surface of the gas heater;
c. means for coupling said reservoir to the water heater to pass preheated water thereto;
d. a container enclosing said water reservoir in spaced relation, said container including an annular side wall, a top wall, and a bottom wall, said bottom wall having an opening to accommodate the exhaust gas flue duct of the gas heater, and said top wall having an outlet to accommodate a flue duct carrying the exhaust gas therebeyond, said bottom wall also including leg holes to accommodate said legs depending from said skirt to the top surface of the gas heater;
e. insulation interposed between said reservoir and said container;
f. means for carrying the hot flue gases through said opening in said bottom wall of said container and through said water reservoir to said outlet in said top wall of said container in heat exchanging relation with the water in said reservoir; and,
g. means for increasing the residence time of the flue gases within said container and said reservoir, said residence time increasing means including:
1. said means for carrying the hot flue gases comprising a plurality of pipes disposed within said reservoir, said pipes merging to form an outlet manifold having an outlet having substantially the same cross sectional area as the opening for the exhaust gas flue duct of the gas heater,
2. a plurality of augers contained within said pipes, said augers mounted on respective stems each supported at opposite extremities by spiders engaging the interior wall of the respective pipe, and
3. a baffle plate interposed between said reservoir and said bottom wall of said container, said baffle plate including a plurality of holes circumscribing said plate for the passage of flue gas emerging from the exhaust gas flue duct of the gas heater into the space between said baffle plate and said bottom wall of said container, the cross sectional area of the baffle plate being larger than the cross sectional area of said exhaust gas flue duct opening for diffusing and lowering the velocity of the emergent gases.

4. A preheater for a conventional gas-fired hot water heater comprising, in combination:
a. a water reservoir having an upper wall, a lower wall and a circular in section side wall, said reservoir including a skirt depending from the periphery of said lower wall;

b. a container enclosing said reservoir in spaced relation and having a top wall, a bottom wall and an annular side wall;
c. a plurality of legs depending from said skirt for supporting said reservoir above the top surface of the gas heater;
d. a pair of conduits in fluid communication with said reservoir allowing the through passage of water for the transfer of preheated water from said reservoir to the gas heater;
e. a duct for carrying the hot flue gases emerging from the gas heater through an opening in said bottom wall of said container into the space between said bottom wall of said container and said lower wall of said reservoir and into the space between said circular in section side wall of said reservoir and said annular side wall of said container, the combined cross sectional area of said spaces exceeding the cross sectional area of said duct in order to diffuse and lower the velocity of the hot flue gases and thereby increase the residence time of the hot flue gases with respect to said reservoir;
f. at least one pipe in communication at its lower end with the space between said bottom wall of said container and said lower wall of said reservoir, said pipe extending upwardly through said reservoir in heat exchanging relation with the water in said reservoir, thence through an opening in said upper wall of said reservoir and through an outlet in said top wall of said container;
g. fixed auger means disposed in said pipe for further increasing the residence time of hot flue gases passing through said pipe;
h. a baffle plate interposed in the space between said bottom wall of said container and said lower wall of said reservoir, said baffle plate being mounted on the lower portion of said skirt and including a plurality of holes circumscribing said plate for the passage of hot flue gases into a space defined by said plate, said skirt and said lower wall of said reservoir for further increasing the residence time of hot flue gases in heat exchanging relation with said reservoir; and,
i. a thermally insulating barrier interposed between said circular in section side wall of said reservoir and said annular side wall of said container for containing and increasing the residence time of hot flue gases in heat exchanging relation with said reservoir.

* * * * *